United States Patent [19]
Pantek

[11] 3,881,255
[45] May 6, 1975

[54] INSTRUMENT FOR INSCRIBING GEOMETRICAL LOOPS

[76] Inventor: Henry R. Pantek, 8717 Fallen Oak Dr., Bethesda, Md. 20034

[22] Filed: Apr. 5, 1974

[21] Appl. No.: 458,436

[52] U.S. Cl. ............................................. 33/27 R
[51] Int. Cl. ............................................. B43l 9/00
[58] Field of Search ....... 33/27 R, 27 B, 27 C, 27 F, 33/32 B, 18 R, 23 D, 24 C, 25 R, 30 G, 27 L, 27 M, 27 J

[56] References Cited
UNITED STATES PATENTS
1,010,612    12/1911    Garinger ............................ 33/27 R Primary Examiner—Richard E. Aegerter
Assistant Examiner—Willis Little

[57] ABSTRACT

An instrument for inscribing closed geometrical planar loops comprising three arm members one of which is fixed and functions as the axis of the loop and the other two are joined together and to the axis member in a pivotal relationship such that when one of these arms is rotated in a radial direction the other arm carrying two scribe points generates the geometrical loop. This instrument is useful for generating such loops for drafting purposes and particularly for inscribing a figure skaters double loop on an ice skating surface.

9 Claims, 12 Drawing Figures

INSTRUMENT FOR INSCRIBING GEOMETRICAL LOOPS

This invention relates to an instrument for generating geometric closed planar loops and inscribing them on any desired surface; and more particularly, it relates to an instrument for inscribing on an ice skating surface a figure skater's double loop.

There is a family of closed geometric loops (called "Limacon") which range from one extreme of a loop substantially similar to a circle except that at one point there is a small inwardly facing cusp, to the other extreme, where that cusp is expanded to an inner loop totally inside of the outer loop. These loops are of interest to students of geometry and to designers of machinery and the like. One of these loops is of especial interest to those who do figure skating, particularly on ice, since there is a double loop that is prescribed as a "school figure" that must be traversed in official advanced school figure tests to establish level of proficiency. There is no known simple device for generating such a figure and it is among the objects of this invention to provide an instrument for this purpose.

It is an object of this invention to provide an instrument for generating any of a family of closed geometric symmetrical loops.

It is another object of this invention to provide an instrument for inscribing on a surface of ice a figure skater's double loop.

It is still another object of this invention to provide an instrument which may be used by designers to generate any of a family of closed loops having an inwardly pointing cusp with or without the addition of an inner loop.

Still other objects will be apparent from the more detailed description of this invention which follows.

This invention in its broadest sense comprises an instrument having three arm members joined together at three pivot points, one arm member being fixed with respect to the surface on which the loop is to be inscribed and functioning as the axis about which the loop is symmetrical, and the other two arms cooperating together and moving radially from separate pivot points on the fixed member to generate the loop by means of two inscribing means on one of the moving arms, the exact shape of the loop depending on the locations of the pivot points, the distances between the pivot points and the locations of the inscribing means.

In a more detailed sense this invention provides an instrument for inscribing a closed symmetrical planar loop having an inwardly directed cusp, with or without the addition of an inner loop, said instrument comprising an axis arm member, a radius arm member, and an inscribing arm member joined to each other by three pivots, the first pivot joining the inner end of said radius arm member with the central portion of said axis arm member, the second pivot joining the outer end of said radius arm member and the central portion of said inscribing arm member by means permitting the distance between the first pivot and the second pivot to be adjustable, the third pivot joining the inner end of the axis arm member with the inner end of the inscribing arm member by means permitting the pivot to be adjustable with respect to the distance from it to each of the other two pivots, said inscribing arm member carrying two scribe means for inscribing said loop adjustable to locations along the length of said inscribing arm member, one of said scribe means being located between the second and third pivots and the other of said scribe means being located at the outer end of the inscribing arm member, and said axis arm member having means for fixing its position with respect to the surface on which said loop is to be inscribed.

In the preferred embodiment of this invention the first pivot is fixed with respect to both the axis arm member and the radius arm member; the second pivot is fixed with respect to the inscribing arm member and adjustable to various positions along the length of the radius arm member; and the third pivot is adjustable to various positions along both the axis arm member and the inscribing arm member. Other embodiments can be produced by making the pivots fixed or adjustable with respect to the cooperating arm members in a different arrangement than that described above, and yet the resulting instrument will produce the same family of loops. It is merely a matter of choice as to whether each pivot is fixed or fully adjustable, since each embodiment is an alternative arrangement of the parts of this invention.

In specific embodiments of this invention the instrument is adapted to inscribe on ice by means of a pointed metal device or alternatively by a felt tip ink marker a figure skating double loop.

In still other embodiments of this invention the device is provided with a handle for more convenient operation, and may be prepared in disassemblable or foldable sections to permit the instrument to be reduced in size for storage or for transportation. The invention will be more readily understood by reference to the attached drawings.

Figure 1:
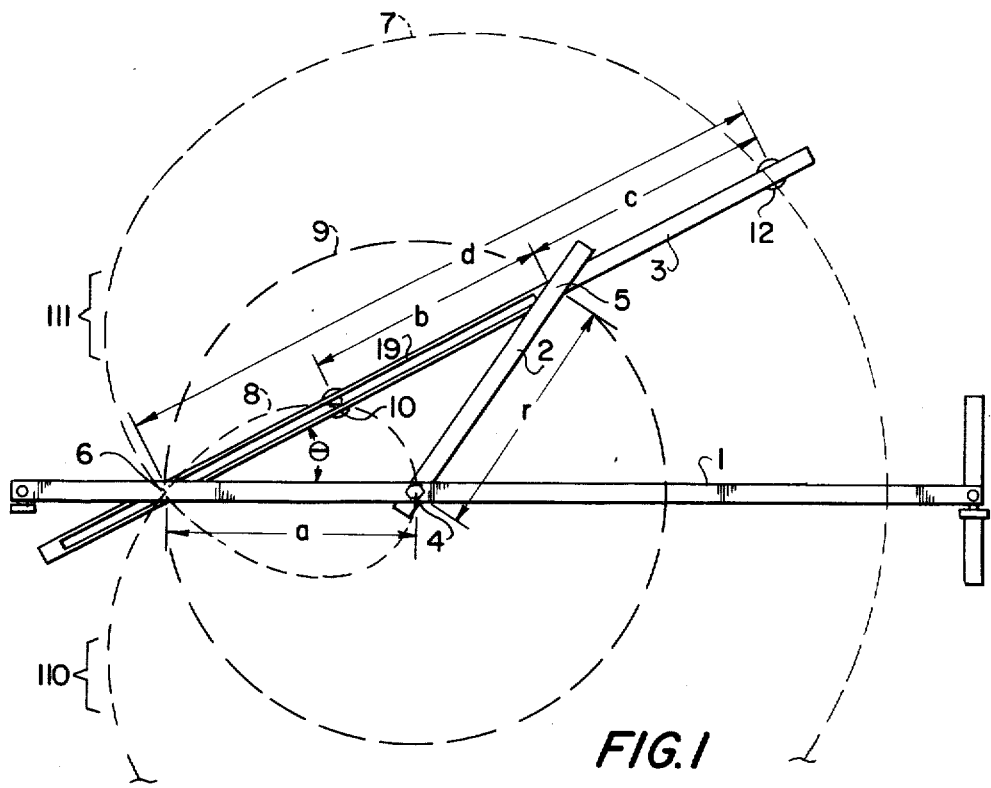
FIG. 1 is a top plan view of the instrument and showing the loop which it generates.
Figure 2:
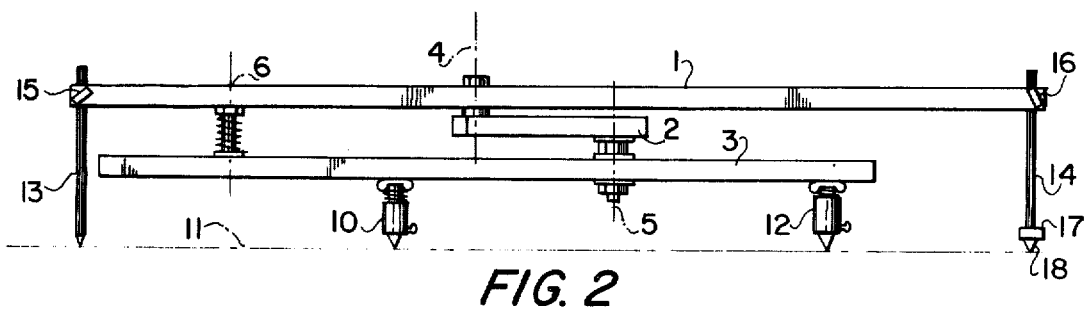
FIG. 2 is an elevational view of the instrument shown in FIG. 1.
Figure 3:
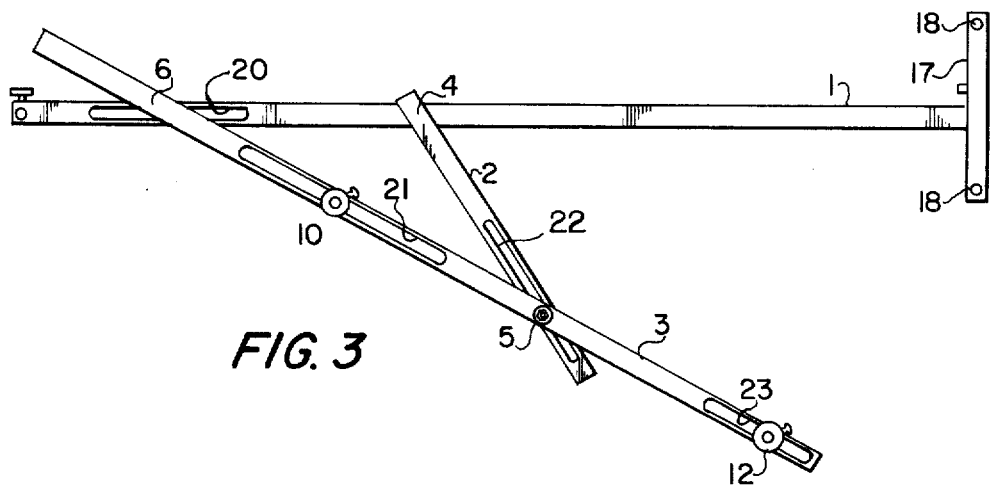
FIG. 3 is a bottom plan view of the instrument shown in FIGS. 1 and 2.

With specific reference to FIGS. 1, 2 and 3 the general features of this invention may be understood. The instrument in its simplest form comprises three arm members joined together in a pivotal fashion at three points with one of the arm members carrying two means for inscribing the loop on a surface. Axis arm member 1 is fixed and held in position with respect to the surface 11 on which the loop is to be inscribed by any suitable means which is adjustable with respect to that surface 11 so as to permit the axis arm member 1 to be fixed in position to be made level with respect to surface 11 and to remain in that position throughout the operation of the instrument. The adjustable means for fixing and leveling axis arm member 1 as shown in these drawings comprise a single support 13 at one end of axis arm 1 and double supports 18 fitted to cross bar 17 and thence to adjustable rod 14. Leveling adjustments are made by means of thumb screws 15 and 16 cooperating respectively with support rods 13 and 14 so that axis arm member 1 may be placed in any position above surface 11 and leveled as desired. The actual contact between axis arm member 1 and surface 11 as shown in these drawings are pointed metal means such as would be suitable on an ice surface. If the instrument were to be employed in drawing a loop on paper attached to a drawing board, these contact points could be needle points such as employed on a drafting compass. Suitable clamping devices or other means obvious to those skilled in the design of drafting instruments could be employed in place of the pointed means for maintaining axis arm member 1 in a fixed position with respect to surface 11.

Radius arm member 2 is joined to axis arm member 1 by pivot 4 at a location generally in the central portion of axis arm member 1. The movement of radius arm member 2 is radial around pivot 4 in a fashion such that pivot 5 would generate the circle 9. Inscribing arm member 3 is joined to axis arm member 1 at pivot 6 and to radius arm member 2 at pivot 5. The exact location of pivots 5 and 6 is adjustable to various locations on the three arm members by means of slots 19, 20 and 22 and the construction of the pivot means which permits them to be moved along the slots and fixed in any desired position. Inscribing arm member 3 also carries the two scribe means 10 and 12 which incribe the loop on surface 11. Scribe means 10 is located between pivots 5 and 6 and scribe means 12 is located at the outer end of inscribing arm member 3. The movement of inscribing arm member 3 is in a general radial fashion around pivot 6 as controlled by pivot 5. Pivot 5 is a fixed location with respect to both of arm members 2 and 3 while pivot 6 is fixed only with respect to its location on axis arm member 1 and permits sliding movment of inscribing arm member 3 by means of slot 19 as arm member 3 is moved radially. The loop which is inscribed by the operation of this instrument comprises outer loop 7 having an inwardly pointed cusp at pivot 6 and having an inner loop 8. It will be recognized that this is one continuous line intersecting itself at pivot 6 and which is symmetrical about axis arm member 1. Depending on the various locations of pivots 5 and 6 and of scribe means 10 and 12 the shape and size of loops 7 and 8 will vary. Graduated scales are inscribed on, or attached to the three arm members along slots 20, 21, 22, and 23, so as to permit precise adjustment of pivots 5 and 6 and scribe means 10 and 12 without resort to measuring tapes or the like. In the interests of simplification these graduated scales are not illustrated on the attached drawings.

Figure 4:
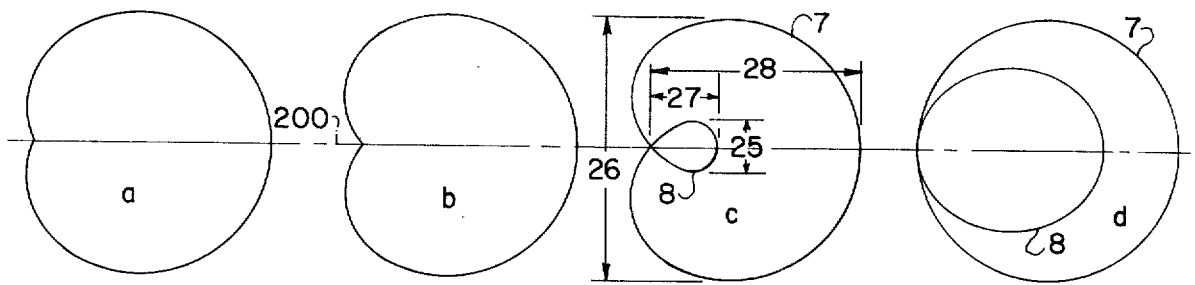
FIG. 4 shows four of the family of loops which may be generated by the instrument of this invention.

FIG. 4 shows the general extremes of the family of loops which are generated by the instrument of this invention. When the distance between pivots 4 and 5 (labelled $r$ in FIG. 1) is the same as the distances from 5 to 10 (labelled $b$ in FIG. 1) and from 5 to 12 (labelled $c$ in FIG. 1) and from 4 to 6 (labelled $a$ in FIG. 1) the loop which is generated is substantially that as shown in FIG. 4c. When $b$ and $c$ are less than $r$ and $a$ equals $r$ the inscribed loop has the general configuration of FIG. 4d which shows an enlargement of the inner loop. When $b$ and $c$ are made larger and larger than $r$ while $a$ remains equal to $r$ inner loop 8 becomes smaller and smaller until it disappears as shown at FIG. 4b when each of $b$ and $c$ are substantially twice $r$. As $b$ and $c$ are made even larger than twice $r$ while $a$ and $r$ remain equal, the inwardly pointing cusp becomes less and less pronounced as shown in FIG. 4a. Each of the loops in FIG. 4 is however symmetrical about axis 200 which is a projection of axis arm member 1 on surface 11.

The general mathematical equation for these loops is $$d = c + 2r \cos \Theta$$

where the symbols are for the distances and angles shown in FIG. 1, some of which are described above. The other symbols, $d$ and $\Theta$ are defined as follows:

$d$ = distance from pivot 6 to scribe 12

$\Theta$ = angle between arm 1 and arm 3.

In the special case where $b = c = r$ (which is the case for the loop of FIG. 4c) the equation becomes $d = r(1 + 2 \cos \Theta)$.

With specific reference to FIG. 4c this loop is that which is referred to above as the "school figure." In such a loop the general dimensions of the outer loop as shown at 26 is to approximate the height of the skater, the length of inner loop 8 as shown at 27 should be approximately one-third the loop dimension 28, and the width of inner loop 8 as shown at 25 should be approximately two-thirds of the dimension 27.

In order to provide an indication of the general dimensions of the instrument of this invention when it is used to inscribe a skater's loop on ice, the following have been found suitable:

Arms 1, 2, and 3 are of 1 inch × 1 inch square aluminum tubular stock, 1 about 6 feet long, 2 about 2 feet long, and 3 about 5 feet long.

Pivots 4, 5, and 6 employ 5/16 inch bolts as the principal components.

Support rods 13 and 14 are ½ inch solid rods about 10 inches long.

Cross bar 17 is about ¼ inch × 1 inch × 12 inches long.

Figure 5:
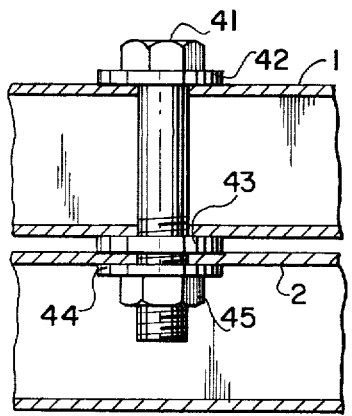
FIG. 5 is a sectional view showing the pivot between the radius arm member and the axis arm member of the instrument.

FIG. 5 shows the details of pivot 4 joining axis arm member 1 to radius arm member 2 in its preferred embodiment the pivot comprises bolt 41, washer 42, separator 43, washer 44 and nut 45. Each of these parts can be standard commercially available materials. Separator 43 can be simply one or more washers such as 42 and 44 or can be a single piece of material having low friction characteristics and providing a constant thickness to separate arm member 1 from arm member 2.

Figure 6:
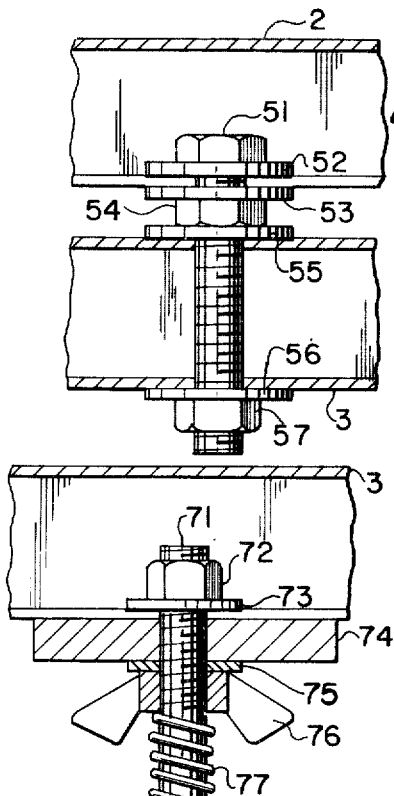
FIG. 6 is a sectional view showing the pivot joining the radius arm member to the inscribing arm member.

FIG. 6 is a detailed drawing of the pivot means at 5 of FIG. 1 joining radius arm member 2 and inscribing arm member 3. The combination shown here comprises bolt 51 cooperating with washers 52 and 53 to permit the bolt to be adjusted along slot 22 as shown in FIG. 3 and to be fixed in any desired position by nut 54 which in turn cooperates with washer 55 to function as a separator to provide the proper spacing between arm members 2 and 3. Washer 52 is preferably a twist tooth washer to provide better locking effect. Bolt 51 is attached in a fixed position to arm member 3 by means of washer 56 and nut 57. It will be seen that bolt 51 cooperates with slot 22 to be adjustable with respect to radius arm member 2 but that it is in a fixed position with respect to inscribing arm member 3.

Figure 7:
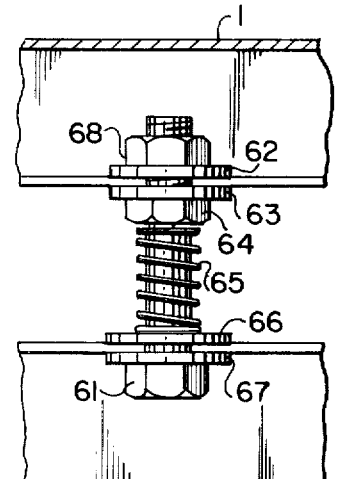
FIG. 7 is a sectional view showing the pivot joining the axis arm member to the inscribing arm member.

FIG. 7 is a detailed drawing of the pivot means at 6 joining axis arm member 1 and inscribing arm member 3. The combination comprises bolt 61, washers 62 and 63, nut 64, spring 65, washers 66 and 67 and lock nut 68. Washers 62 and 63 are needed to provide means for bolt 61 to cooperate with slot 20 in axis arm member 1, and similarly, washer 66 and 67 are needed to provide means for bolt 61 to cooperate with slot 19 in inscribing arm member 3. Washer 62 is preferably a twist tooth washer to provide a better locking effect. Nut 64 provides a means for fixing the location of bolt 61 with respect to axis arm member 1. Inscribing arm member 3 is in a sliding relationship with respect to bolt 61 and accordingly little or no pressure is applied as between washers 66 and 67. Spring 65 is employed to maintain a proper spacing between axis arm member 1 and inscribing arm member 3 during the operation of the instrument.

Figure 8:
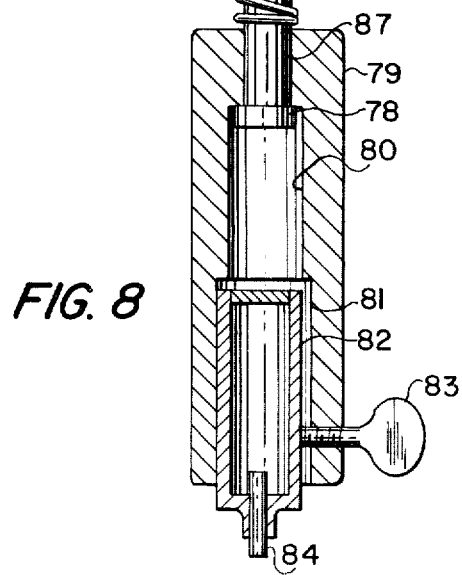
FIG. 8 is a sectional view of the scribe means fitted with a felt tip for inking.
Figure 9:
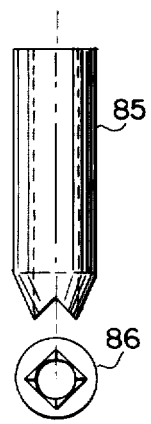
FIG. 9 shows a preferred embodiment for a metal pointed means for inscribing the loop on ice.

FIGS. 8 and 9 are details of the scribe means 10 and 12 in FIGS. 1, 2 and 3. Bolt 71 with its head 78 supporting scribe housing 79 is attached to arm member 3 by means of washer 73, preferably a twist tooth washer for better locking effect, and stop nut 72. Arm member 3 is separated from scribe housing 79 by washer 74, washer 75, wing nut 76 and spring 77 biased outwardly against wing nut 76 and housing 79. Spring 77 permits upward movement of housing 79 when irregularities are encountered in the surface on which the loop is to be inscribed. Housing 79 contains a small bore 87 designed to accommodate the shank of bolt 71, a larger bore 80 designed to accommodate head 78 and a still larger bore 81 designed to accommodate scribe 82. Washer 74 is illustrated as a large item made from lead to provide weight to overcome any tendency of the scribe means to skip and jump during the inscribing operation. If the instrument is large enough to provide its own weight, washer 74 can be of normal size and ordinary material as is washer 75. The size and weight of housing 79 can be increased to provide additional weight if desired. In FIG. 8 scribe 82 is a hollow housing for holding ink or felt soaked with ink in its interior portions and a felt tip 84 for delivering the ink from the interior reservoir to the surface upon which the loop is to be inscribed. Thumb screw 83 provides an adjustment for the exact positioning of scribe 82. FIG. 9 shows an alternative means for scribe 82. In FIG. 9 the means is a thick-walled hollow metal tube 85 which has been cut by two V-cuts at right angles to each other to provide a four tip point as shown at 86. Solid rod material is, of course, a suitable alternative for scribe 85. The size of scribe 85 is substantially identical to that of 82 and would be held in the same position by thumb screw 83.

Figure 10:
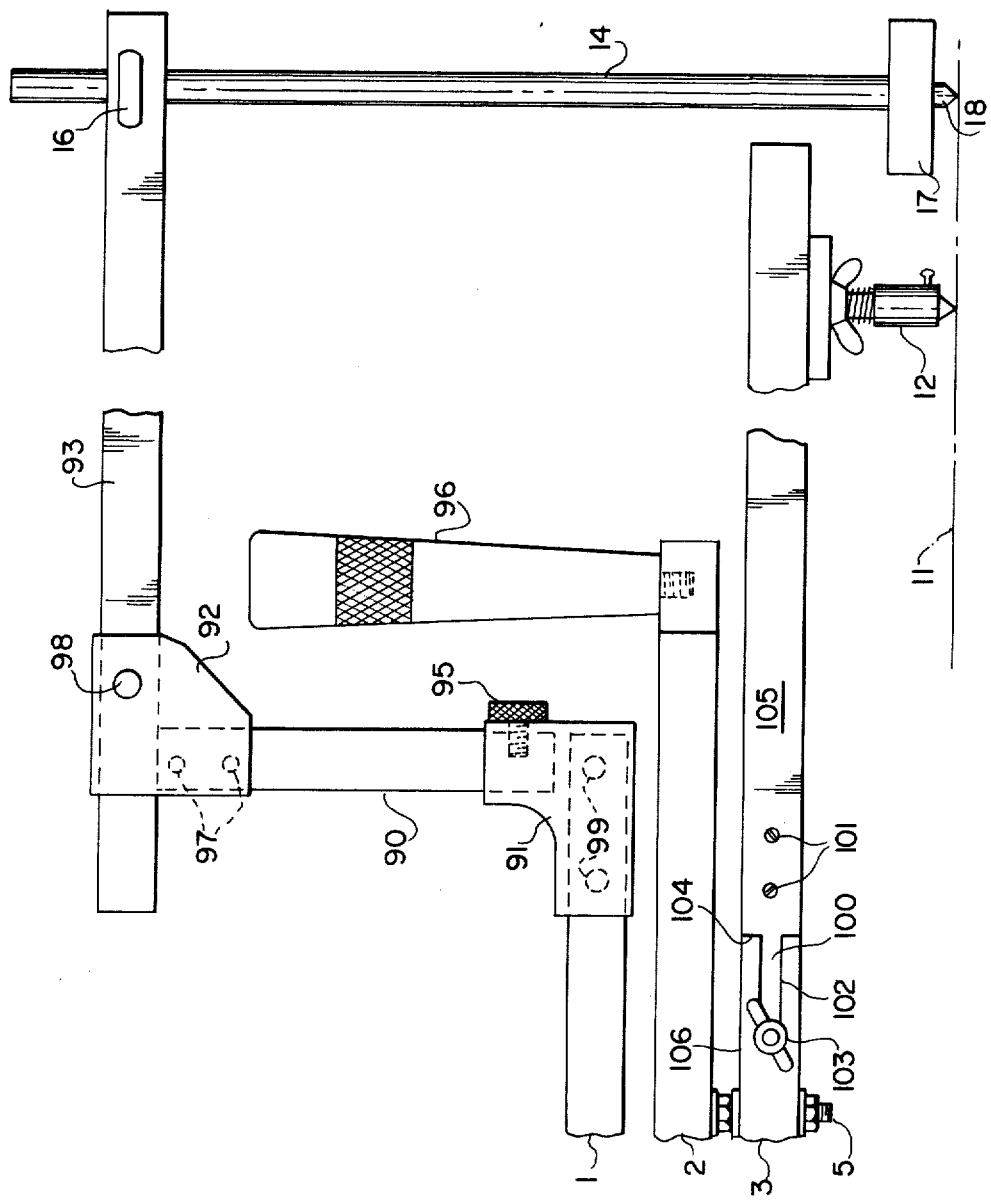
FIG. 10 illustrates one embodiment wherein a handle is provided for operation of the instrument of this invention and means are provided for folding and disassembling the instrument to a reduced size for storage or for transportation.

FIG. 10 illustrates a means for incorporating a handle to more conveniently operate the instrument of this invention and means for manufacturing the various parts of the instruments in sections which may be disassembled so as to reduce the size of the instrument for storage or transportation. Radius arm member 2 is the member which is manually operated in order to inscribe the loop in accordance with this invention and it therefore must be provided with handle 96 of its equivalent to provide easier manipulation of the instrument. If the handle is upright to provide easier manipulation of the instrument on a surface of ice, for example, it is necessary that axis arm member 1 provide a passageway for handle 96 to swing in a full radial extension. This passageway is accomplished by terminating axis arm member 1 short of the handle and building an L-shaped extension to permit the handle to pass thereunder. As shown in the drawing, arm member 1 is terminated short of handle 96 and fitted with corner fixture 91 which is riveted at 99 to arm member 1 and which provides a support for thumb screw 95 to connect vertical extension 90 to corner fixture 91. Vertical extension 90 is riveted at 97 to swivel plate 92 which is attached to horizontal extension 93 by means of swivel pin 98. Horizontal extension 93 is attached to support rod 14 through thumb screw 16 as described with reference to FIGS. 1, 2 and 3 previously. Swivel plate 92 functions by permitting horizontal extension 93 and vertical extension 90 to pivot about swivel pin 98 when the opposite ends of horizontal extension 93 and vertical extension 90 are free of any confinement. If any of the arm members 1, 2, or 3 is too long to be sufficiently portable in a convenient manner they may be broken at any convenient location and fitted with internal joints as shown with respect to arm member 3 in FIG. 10. The arm member is broken at 104 and the outer portion 105 is fitted with an internal tongue 100 which is attached to the inside of section 105 by any convenient means such as screws 101 and which is machined to fit the internal contours of section 106. When tongue 100 is fitted into the internal contours of section 106 the two sections are joined together in a fixed relationship by means of any suitable holding device such as a thumb screw or wing nut (as shown) 103 attached to tongue 100 and being able to pass over the outer surface of section 106 by means of slot 102. Such a juncture would of course be incorporated into arm member 3 at some location where it would not interfere with a pivot such as 5 or a scribing means such as 12.

Figure 11:
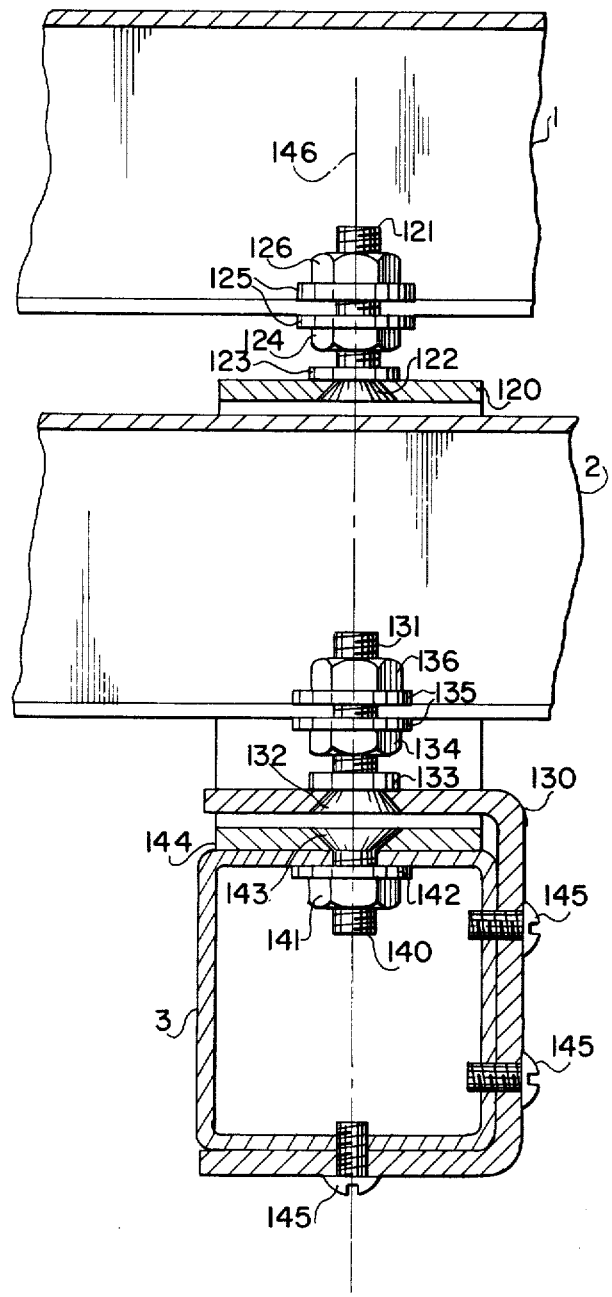
FIG. 11 is a sectional view in elevation of a preferred design for the pivot connecting the axis arm member and the inscribing arm member.
Figure 12:
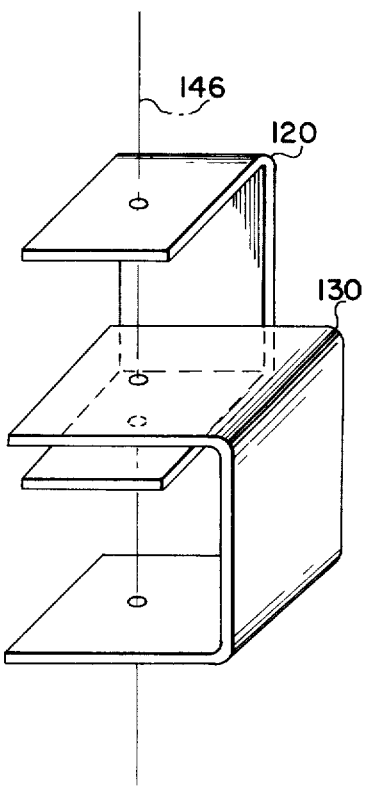
FIG. 12 is a schematic partial illustration of the arrangement of the design shown in detail in FIG. 11.

FIGS. 11 and 12 show devices whereby the entire loop 7 can be inscribed without any gaps which would normally occur by reason of the interference of the outer end of radius arm member 2 and pivot 6. If the device of FIGS. 11 and 12 is not employed there is a small gap at 110 and a second small gap at 111 as seen on FIG. 1 due to the fact that the radius arm member 2 is prevented by pivot means 6 from making a complete rotation because of the interference of these two parts of the instrument at 6. In the embodiment of FIGS. 11 and 12, pivot means 6 is substituted by off-set means which permit radius arm member 2 to make a complete revolution from the center line of pivot means 6 360° around to the center line of pivot means 6. The center line of pivot 6 of FIG. 2 is shown as 146 in FIGS. 11 and 12. Axis arm member 1 and inscribing arm member 3 are joined to each other through off-set plate 120 which as may be seen in FIG. 12 is C-shaped of a large enough size for radius arm member 2 to fit within the shape. Axis arm member 1 is attached to the top of off-set plate 120 by means of bolt 121 having a flat head 122 and being held in place by a lock nut 123 so as to provide no projection into the inner space of off-set plate 120. Axis arm member 1 is fixed to bolt 121 by means of nuts 124 and 126 and washers 125. To the bottom leg 144 of off-set plate 120 there is attached by a similar bolt 140 with a flat head 143, a washer 142 and a nut 141 inscribing arm member 3. Off-set plate 120 is loosely held by flat heads 122 and 143 so that it can swivel 360° and thereby eliminate both gaps 110 and 111.

At pivot 5 radius arm member 2 is joined to inscribing arm member 3 by means of off-set plate 130 which is attached to radius arm member 2 by means of bolt 131 having a flat head 132 and secured to off-set bolt plate 130 by means of lock nut 133 and fixed to radius arm member 2 by means of nut 134, washers 135 and nut 136. Inscribing arm member 3 is fixed to off-set plate 130 by suitable screws such as that shown at 145. It is therefore possible by means of this arrangement which is shown schematically at FIG. 12 to permit pivot 5 and pivot 6 to become aligned to pivot 6 location thus permitting a complete 360° rotation of radius arm member 2 which will eliminate any gaps whatsoever in the inscribing of loops 7 and 8 as shown in FIG. 1.

The foregoing description of FIGS. 1–12 presents the preferred combination of adjustable parts in the instrument of this invention. It should be recognized, however, that there are alternatives which produce the same results. This is particularly so with respect to the fixed or adjustable nature of pivots 4, 5, and 6. Pivot 4 is shown in the illustrations herein to be fixed with respect to arms 1 and 2, while it could be adjustable with respect to either or both by providing suitable slots and modification of pivot 4 to slide in those slots. Similarly, pivot 5 could be made adjustable with respect to arm 3. These modifications, however, do not provide a different instrument; they merely provide an equivalent means for accomplishing the same result and are considered to be part of this invention. Similar equivalent results are obtained by changing selected adjustable pivots to fixed pivots. So long as these alternatives permit the radial arm 2 to move inscribing arm 3 around axis arm 1 in the same general manner as described above, the same family of loops will be generated.

In the operation of the isntrument of this invention axis arm member 1 is positioned on the surface on which the desired loop is to be inscribed and adjusted in a level position such that scribe means 10 and 12 are touching the surface with sufficient pressure to inscribe the loop with whatever means may be employed at the tip of scribe means 10 and 12. Axis arm member 1 is oriented in the direction such that it will function as the central axis for the loop aligned along the projection of the inwardly pointing cusp and the lengthwise axis of the inner loop, if such a loop is to be inscribed. Scribe means 10 and 12 are then adjusted with respect to pivot 5 so that the distances 5–10 and 5–12 are equal to each other. The position of pivot 5 is adjusted to any desired location along slot 22. Similarly, the position of pivot 6 is adjusted with respect to pivot 4 to a location along slot 20. If, for example, a skater's loop is to be inscribed, the distances 5 to 10, 5 to 12, 4 to 5, and 4 to 6 are all equal to each other. The instrument is then operated by moving the outer end of radius arm 2 in a circle as shown by 9 on FIG. 1 which in turn causes scribing means 10 and 12 to inscribe the loop as shown on surface 11. If the device shown in FIG. 11 is not employed there will be a short gap in the loop at locations 110 and 111 due to the fact that the outer end of radius arm 2 cannot swing past pivot 6. Scribing means 10 provides the scribing for the loop between locations 110 and 111 toward the cusp at pivot 6 and throughout inner loop 8 while scribing means 12 provides the means for inscribing outer loop 7 from location 110 to 111. If the device shown in FIG. 11 is employed the gaps in loop 7 are omitted.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. An instrument for inscribing on a surface a closed symmetrical planar loop having an inwardly directed cusp, said instrument comprising an axis arm member, a radius arm member, and an inscribing arm member joined to each other in a spaced relationship by three pivots, the first pivot joining the radially inner end portion of said radius arm member with the central portion of said axis arm member, the second pivot joining the radially outer end portion of said radius arm member and the central portion of said inscribing arm member by means permitting the distance between the first pivot and the second pivot to be adjustable, the third pivot joining one end portion of the axis arm member with one end of the inscribing arm member by means permitting the pivot to be adjustable with respect to the distance from it to each of the other two pivots, said inscribing arm member carrying two scribe means for inscribing said loop adjustable to locations along the length of said inscribing arm member, one of said scribe means being located between the second and third pivots and the other of said scribe means being located at the other end portion of the inscribing arm member, and said axis arm member having means for fixing its position with respect to the surface on which said loop is to be inscribed.

2. The instrument of claim 1 wherein the first pivot is fixed with respect to the radius arm member and fixed with respect to the axis arm member, the second pivot is fixed with respect to the inscribing arm member and adjustable along the length of the radius arm member, and the third pivot is adjustable along the length of the axis arm member and also adjustable along the length of the inscribing arm member.

3. The instrument of claim 1 adapted to inscribe on an ice skating surface a figure skating double loop wherein said scribe means are pointed metal means capable of etching the surface of ice and wherein the means for fixing the axis arm with respect to the ice skating surface are pointed metal means adjustable to provide means for leveling the axis arm above said surface.

4. The instrument of claim 1 adapted to inscribe on an ice skating surface a figure skating double loop wherein said scribe means are felt tip ink markers and wherein the means for fixing the axis arm member with respect to the ice skating surface are pointed metal means adjustable to provide means for leveling the axis arm above said surface.

5. The instrument of claim 1 wherein said radially outer end portion of said radius arm member is provided with a handle for manual operation of the instrument.

6. The instrument of claim 1 wherein said arms are made in disassemblable sections and said pivots are easily disengaged to permit the instrument to be reduced to a compact size for storage or for transportation.

7. The instrument of claim 1 wherein said arm members are made of square metal tubing, said pivots are metal bolts which cooperate with lengthwise slots in said tubing to provide the capability for the pivots to be adjusted to various locations.

8. The instrument of claim 1 wherein said scribe means incorporates a spring biased means between the inscribing arm member and the tip of the scribe permitting the tip to follow automatically irregularities in the surface to be inscribed.

9. The instrument of claim 1 wherein said arms are made in foldable sections and said pivots are easily disengaged to permit the instrument to be reduced to a compact size for storage or transportation.

* * * * *